(12) United States Patent
Nakade et al.

(10) Patent No.: US 7,572,016 B2
(45) Date of Patent: Aug. 11, 2009

(54) REFLECTOR AND BICYCLE

(75) Inventors: Hiroshi Nakade, Higashiosaka (JP); Takashi Ueda, Izumi (JP)

(73) Assignee: CatEye Co., Ltd., Osaka (JP)

( * ) Notice: Subject to any disclaimer, the term of this patent is extended or adjusted under 35 U.S.C. 154(b) by 235 days.

(21) Appl. No.: 11/273,106

(22) Filed: Nov. 14, 2005

(65) Prior Publication Data
US 2006/0103934 A1    May 18, 2006

(30) Foreign Application Priority Data
Nov. 18, 2004    (JP)    ............................. 2004-334693

(51) Int. Cl.
*G02B 5/124*    (2006.01)
(52) U.S. Cl. .................. 359/533; 359/548; 359/550
(58) Field of Classification Search ................. 359/533, 359/548–550
See application file for complete search history.

(56) References Cited

U.S. PATENT DOCUMENTS

| | | | |
|---|---|---|---|
| 1,624,300 A | | 4/1927 | Wood |
| 2,078,103 A | * | 4/1937 | Simmons ..................... 359/517 |
| 3,887,268 A | | 6/1975 | Golden et al. |
| 5,491,586 A | * | 2/1996 | Phillips ....................... 359/530 |
| 6,644,818 B2 | * | 11/2003 | Sloot ........................... 359/530 |
| 2006/0203343 A1 | * | 9/2006 | Modilevsky et al. ........ 359/515 |

FOREIGN PATENT DOCUMENTS

| | | |
|---|---|---|
| CH | 288 602 A | 1/1953 |
| CN | 2159348 Y | 3/1994 |
| CN | 218 6681 Y | 1/1995 |
| CN | 2592484 Y | 12/2003 |
| GB | 433 784 | 8/1935 |
| JP | 02-042551 | 11/1990 |
| JP | 2-042551 Y2 | 11/1990 |
| JP | 2004-148962 A | 5/2004 |
| JP | 2004-149030 * | 5/2004 |
| WO | WO 2005/063556 A | 7/2005 |

OTHER PUBLICATIONS

English Translation of Chinese Patent Office Action dated Aug. 24, 2007.

* cited by examiner

*Primary Examiner*—James Phan
(74) *Attorney, Agent, or Firm*—Olson & Cepuritis, Ltd.

(57) ABSTRACT

A reflector comprises a body having a reflecting member constituting the front surface and a base member mounted on the reflecting member and a plurality of reflex reflector structures provided along the front surface of the body, while the front surface has a curved shape arched in a longitudinal section of the body and the optical axes of the plurality of reflex reflector structures are directionally constant along the overall longitudinal direction of the body.

7 Claims, 18 Drawing Sheets

REFLECTOR AND BICYCLE

BACKGROUND OF THE INVENTION

1. Field of the Invention

The present invention relates to a reflector and a bicycle, and more particularly, it relates to a reflector having high attachment freedom and a bicycle comprising this reflector.

2. Description of the Background Art

For example, Japanese Utility Model Publication No. 02-042551 (1990: first patent document) and Japanese Patent Laying-Open No. 2004-149030 (second patent document) describe reflectors attached to fenders of bicycles.

The first patent document discloses a reflector having a substantially flat front surface, while the second patent document discloses a reflector having a curved front surface.

The reflector having a flat front surface disclosed in the first patent document is attached to a fender of the rear wheel of the bicycle. This reflector is attached to the fender through a base plate shaped in correspondence to the bent shape of the fender. As a result, the reflector may project from the bent member to disturb the cyclist.

On the other hand, it is important to provide a reflector capable of ensuring constant reflection luminous intensity with respect to incident light of a wider angle. Thus, the reflector is improved in attachment freedom.

In the second patent document disclosing a reflector reflecting light in two directions, however, the reflection luminous intensity may be restricted due to this structure limiting the directions of the reflected light. Further, the reflector according to the second patent document, intentionally dividing the reflected light into two directions, is absolutely different in premise and structure from the inventive reflector having reflex reflector structures.

SUMMARY OF THE INVENTION

An object of the present invention is to provide a reflector having high attachment freedom and a bicycle comprising this reflector.

The reflector according to the present invention comprises a body and a plurality of reflex reflector structures provided along the front surface of the body, while the front surface has a curved shape arched along a longitudinal section of the body and the optical axes of the plurality of reflex reflector structures are directionally constant along the overall longitudinal direction of the body.

For example, cubic structures are employable as the aforementioned reflex reflector structures. Alternatively, structures employing spherical glass beads or the like are also conceivable. The front surface of the reflector preferably has an arcuate curved shape.

The front surface of the reflector preferably has a central portion extending in a transverse direction perpendicular to the front-back direction and inclined portions obliquely backwardly inclined on both sides of the central portion in a cross section of the body.

In the bicycle according to the present invention, the aforementioned reflector is attached to a fender of the rear wheel According to an aspect of the aforementioned bicycle, an opening is provided on the fender so that the reflector is assembled into the opening.

According to another aspect of the aforementioned bicycle, the reflector is assembled into a stay for fixing the fender, to be fixed to the fender through the stay.

According to still another aspect of the aforementioned bicycle, the reflector is attached to the fender employed as a base portion covering the reflex reflector structures. The base portion covers the reflex reflector structures so that no water or the like infiltrates into the reflex reflector structures.

According to the present invention, constant reflection luminous intensity can be ensured with respect to light incident upon the reflector at a wider angle. As a result, the reflector is improved in attachment freedom.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

A reflector according to an embodiment of the present invention and a bicycle comprising the reflector are now described.

Figure 1:
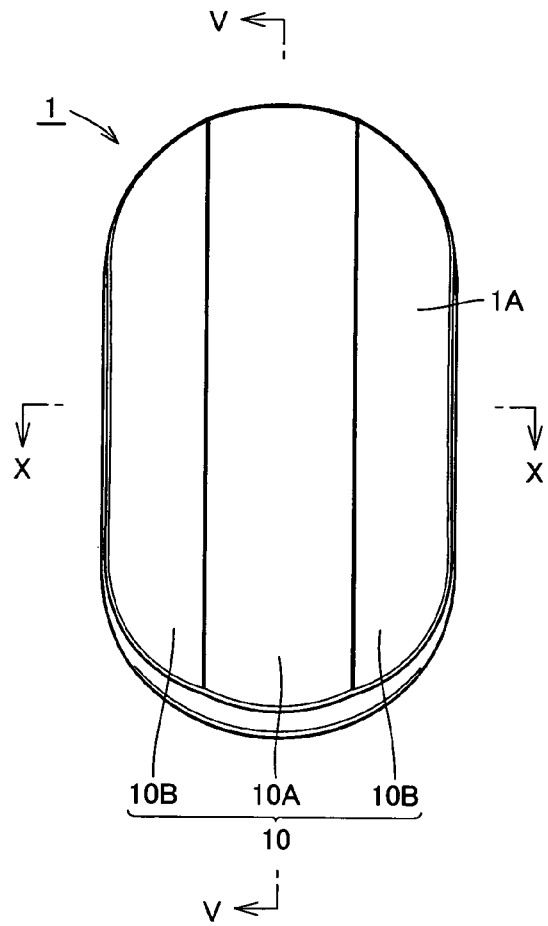
FIG. 1 is a front elevational view of a reflector according to an embodiment of the present invention.
Figure 2:
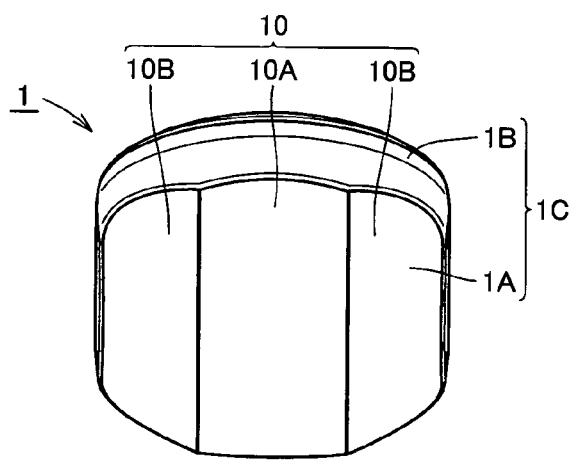
FIG. 2 is a top view of the reflector according to the embodiment of the present invention as viewed from the front side.
Figure 3:
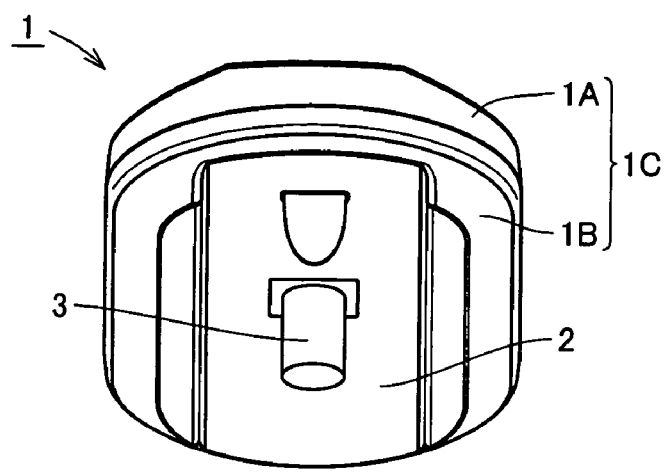
FIG. 3 is a bottom view of the reflector according to the embodiment of the present invention as viewed from the back side.
Figure 4:
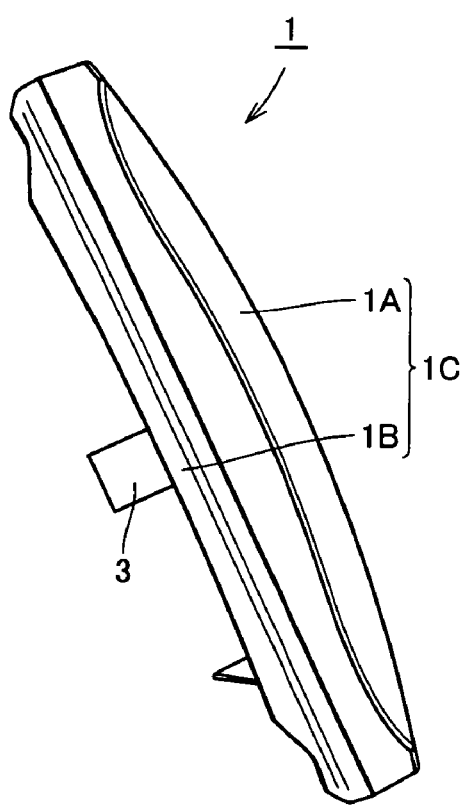
FIG. 4 is a side elevational view of the reflector according to the embodiment of the present invention.
Figure 5:
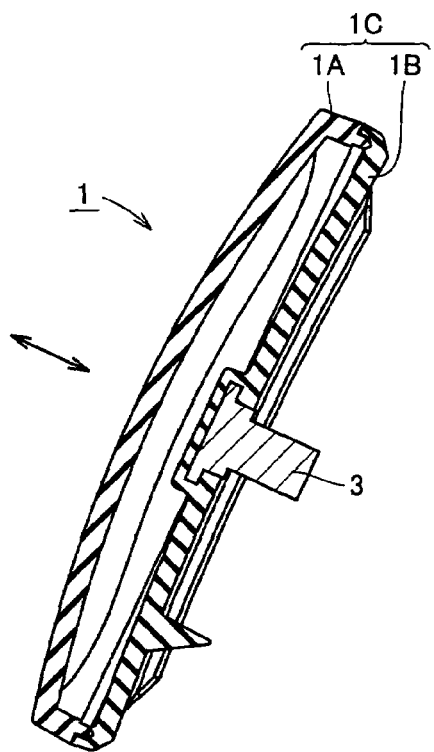
FIG. 5 is a side-sectional view of the reflector according to the embodiment of the present invention taken along the line V-V in FIG. 1.
Figure 6:
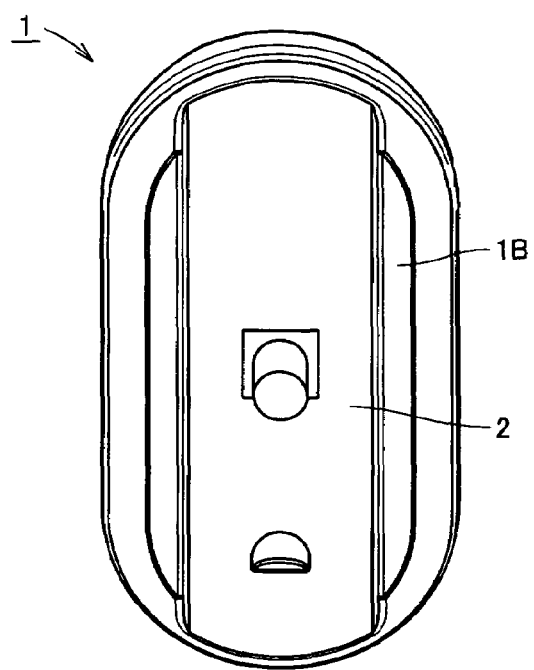
FIG. 6 is a back elevational view of the reflector according to the embodiment of the present invention.

FIGS. 1 to 6 illustrate a reflector 1 according to the embodiment of the present invention. FIG. 1 is a front elevational view, FIG. 2 is a top view as viewed from the front side (front surface), FIG. 3 is a bottom view as viewed from the back side (back surface), FIG. 4 is a side elevational view, FIG. 5 is a side sectional view (taken along the line V-V in FIG. 1), and FIG. 6 is a back elevational view.

Referring to FIGS. 1 to 6, the reflector 1 comprises a reflecting member 1A reflexively reflecting incident light and a base member 1B bonded to the reflecting member 1A. Throughout the specification, the reflecting member 1A and the base member 1B are generically referred to as a body 1C. The body 1C is constituted of resin, for example. The reflecting member 1A is transparent (red).

The body 1C is attached to a fender of the rear wheel of a bicycle through a pedestal 2. An insert screw 3 mounted on the base member 1B passes through the fender.

The reflecting member 1A constitutes the front surface 10 of the body 1C. The front surface 10 has an arcuately curved shape (r=130 mm in the example shown in FIG. 5) in the longitudinal section (shown in FIG. 5) of the body 1A. This curved surface may simply be arched, and an elliptic or parabolic shape is applicable in place of the arcuate shape.

A plurality of cubic structures 4 are provided on the back surface (closer to the base member 1B) of the reflecting member 1A as reflex reflector structures provided along the front surface 10. Thus, the reflector 1 reflexively reflects incident light.

The front surface 10 has a central portion 10A zonally extending in the longitudinal direction (vertical direction in FIG. 1) and inclined portions 10B located on both sides of the central portion 10A along the horizontal direction. In the cross section of the reflector 1 (taken along the line X-X in FIG. 1), the central portion 10A extends perpendicularly to the front-rear direction of the reflector 1 (along arrow in FIG. 5), while the inclined portions 10B are obliquely backwardly inclined. Thus, the reflector 1 can attain higher reflection luminous intensity with respect to incident light not only from the front side but also from oblique direction on the front side.

Figure 7:
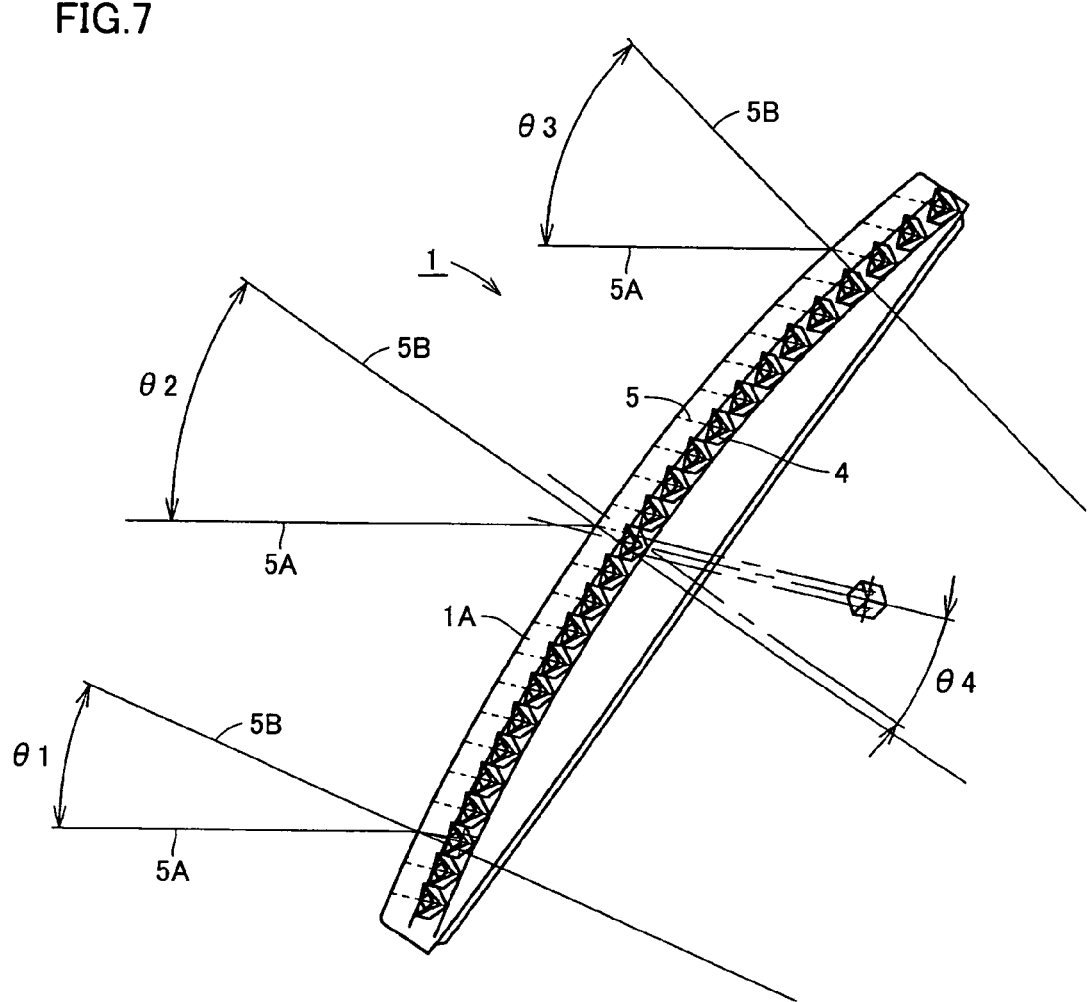
FIG. 7 illustrates the details of reflex reflector structures in the reflector shown in FIGS. 1 to 6.
Figure 8:
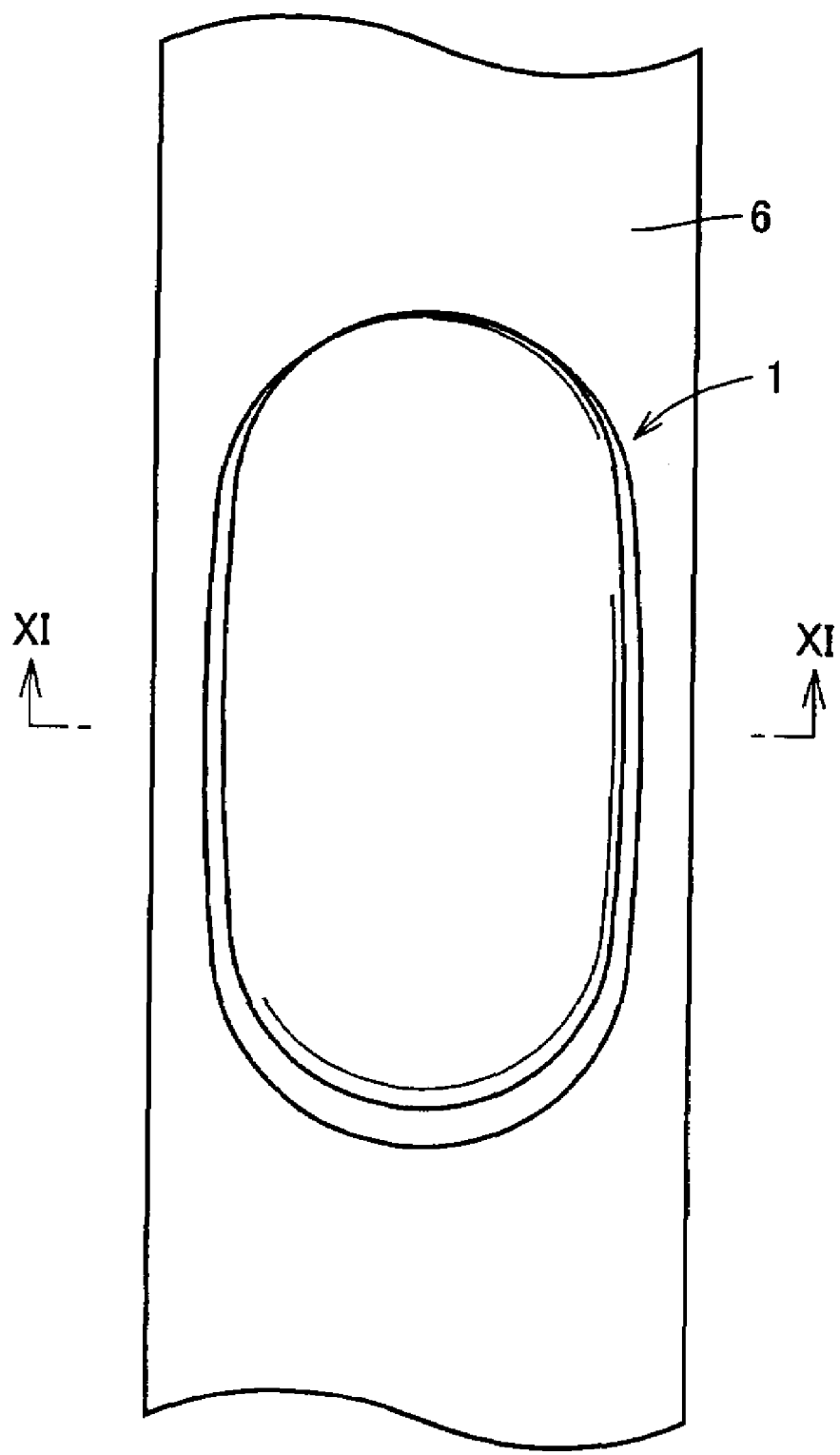
FIG. 8 is a front elevational view showing a first exemplary state of the reflector attached to a fender.
Figure 9:
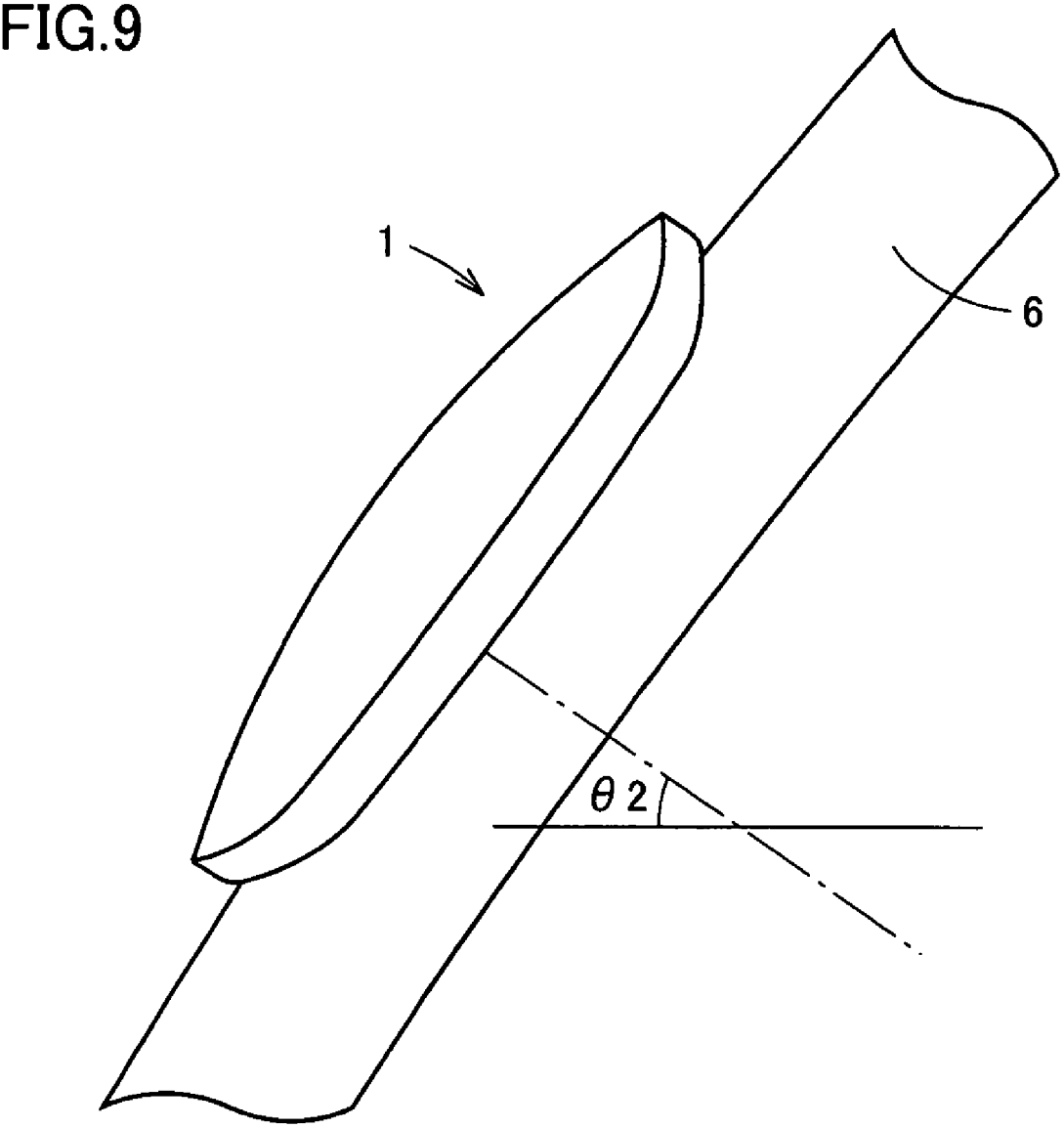
FIG. 9 is a side elevational view showing the first exemplary state of the reflector attached to the fender.
Figure 10:
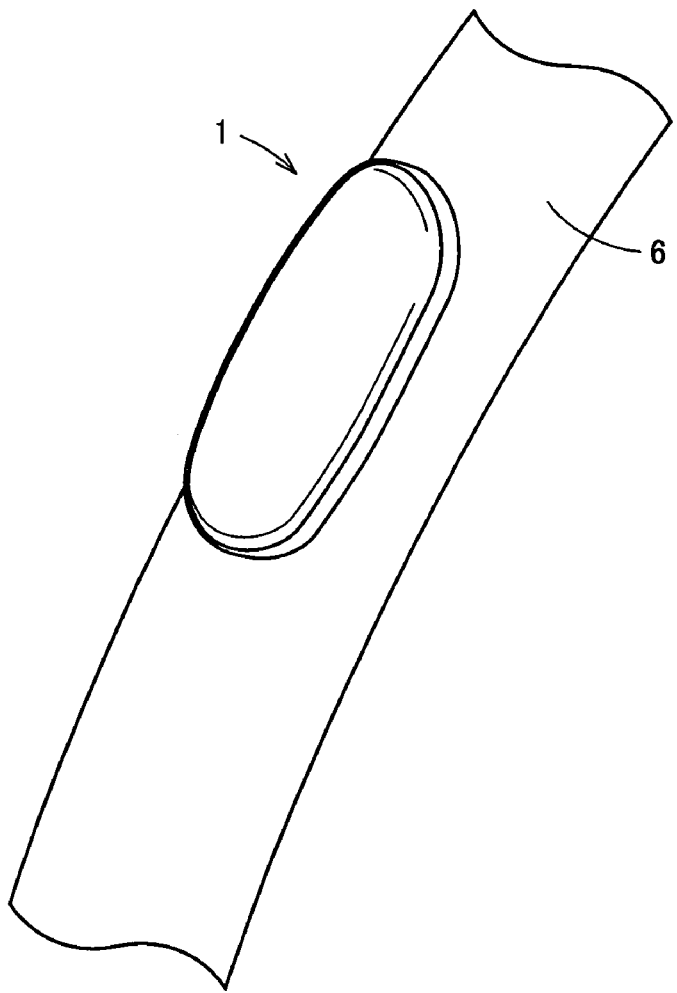
FIG. 10 is a perspective view showing the first exemplary state of the reflector attached to the fender.

FIG. 7 illustrates the details of the reflex reflector structures in the reflector 1.

Referring to FIG. 7, optical axes 5 of the plurality of cubic structures (reflex reflector structures) 4 are directionally constant along the overall longitudinal direction of the reflector 1. This does not necessarily mean that the directions of the optical axes 5 of all longitudinally arranged cubic structures 4 are identical to each other, but the optical axes 5 are to be regarded as constant along the "overall longitudinal direction" if the directions of the optical axes 5 of most cubic structures 4 are constant also when the directions of the optical axes 5 of partial cubic structures 4 are different from those of the optical axes 5 of the remaining cubic structures 4.

The reflector 1 reflects light incident upon the same in this direction. The front surface 10 of the reflector 1 has the curved shape in the longitudinal direction, and hence angles ($\theta_1$, $\theta_2$ and $\theta_3$ in FIG. 7) formed by the directions of incident/reflected light 5A and the directions of perpendiculars 5B with respect to the front surface 10 vary in the longitudinal direction of the reflector 1. In the example shown in FIG. 7, $\theta_1 \approx 23.9°$, $\theta_2 \approx 34.6°$ and $\theta_3 \approx 45.5°$. While the angle $\theta_2$ shows the value at the center of the front surface 10 of the reflector 1, the angle ($\theta_4$) formed by the direction of the optical axis 5 of the cubic structure 4 and the perpendicular 5B with respect to the front surface 10 at the center is about 22°. In other words, the incident/reflected light 5A and the optical axis 5 intersect with each other at an angle of about 12.6° (34.6°-22°) in FIG. 7.

The reflectivity of the aforementioned reflector 1 varies with the angle formed by the direction of the incident light and the optical axes 5 of the cubic structures 4. Therefore, high reflection luminous intensity can be attained by setting the optical axes 5 in a direction suitable to a previously assumed direction of the incident light. While the front surface 10 of the reflector 1 according to this embodiment has the curved shape in the longitudinal direction, the optical axes 5 of the cubic structures 4 are set constant along the overall longitudinal direction and hence high reflection luminous intensity can be attained by setting the optical axes 5 in the direction suitable to the previously assumed direction of the incident light. Consequently, the reflector 1 is improved in attachment freedom.

Further, an effect of attaining reflected light of high luminous intensity with respect to light incident at a wider angle can be improved by arcuately forming the front surface 10 of the reflector 1.

Figure 24:
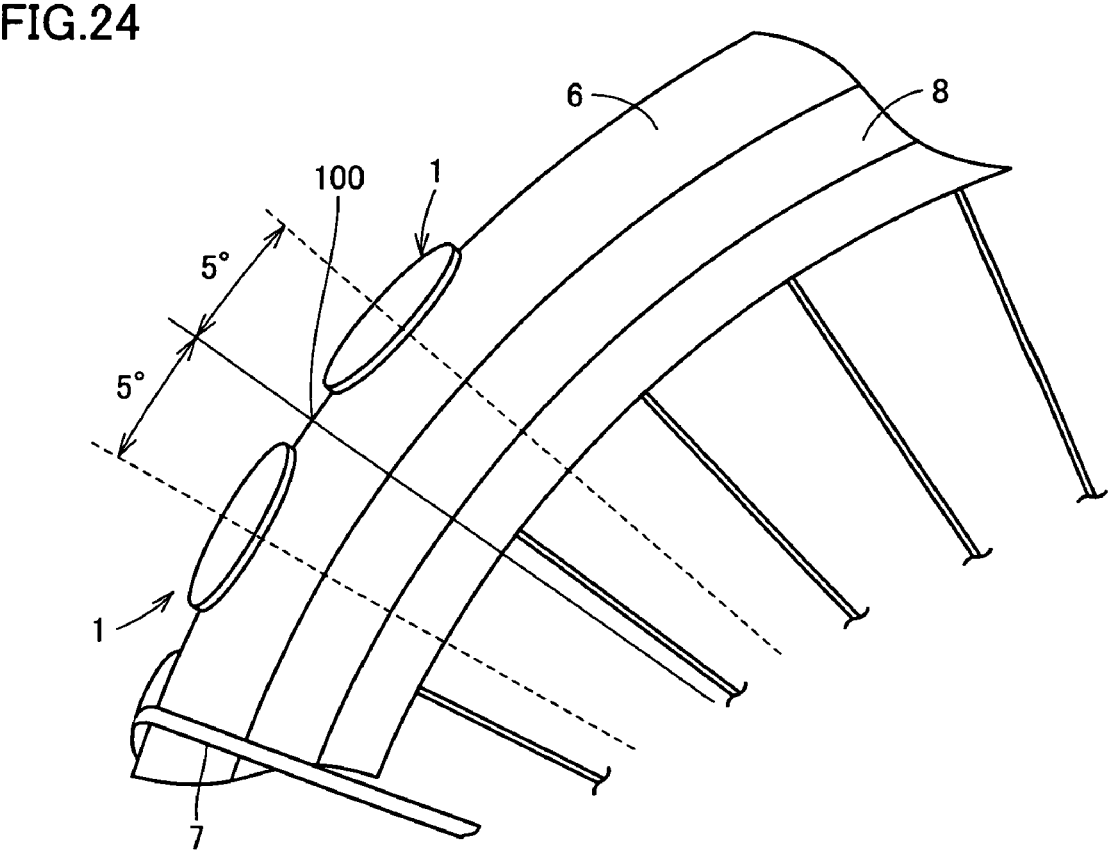
FIG. 24 illustrates an exemplary attachment range of the reflector.

FIG. 24 illustrates an exemplary attachment range of the reflector 1.

Referring to FIG. 24, the reflector 1 is attached to a fender 6 mounted on an upper portion of a rear wheel 8 of a bicycle. A typical attachment position 100 of the reflector 1 can be changed while satisfying the specification required to the reflector 1 in the range of about ±5° with respect to the center of the rear wheel 8.

A reflectivity test method for the reflector 1 is now described.

Figure 25:
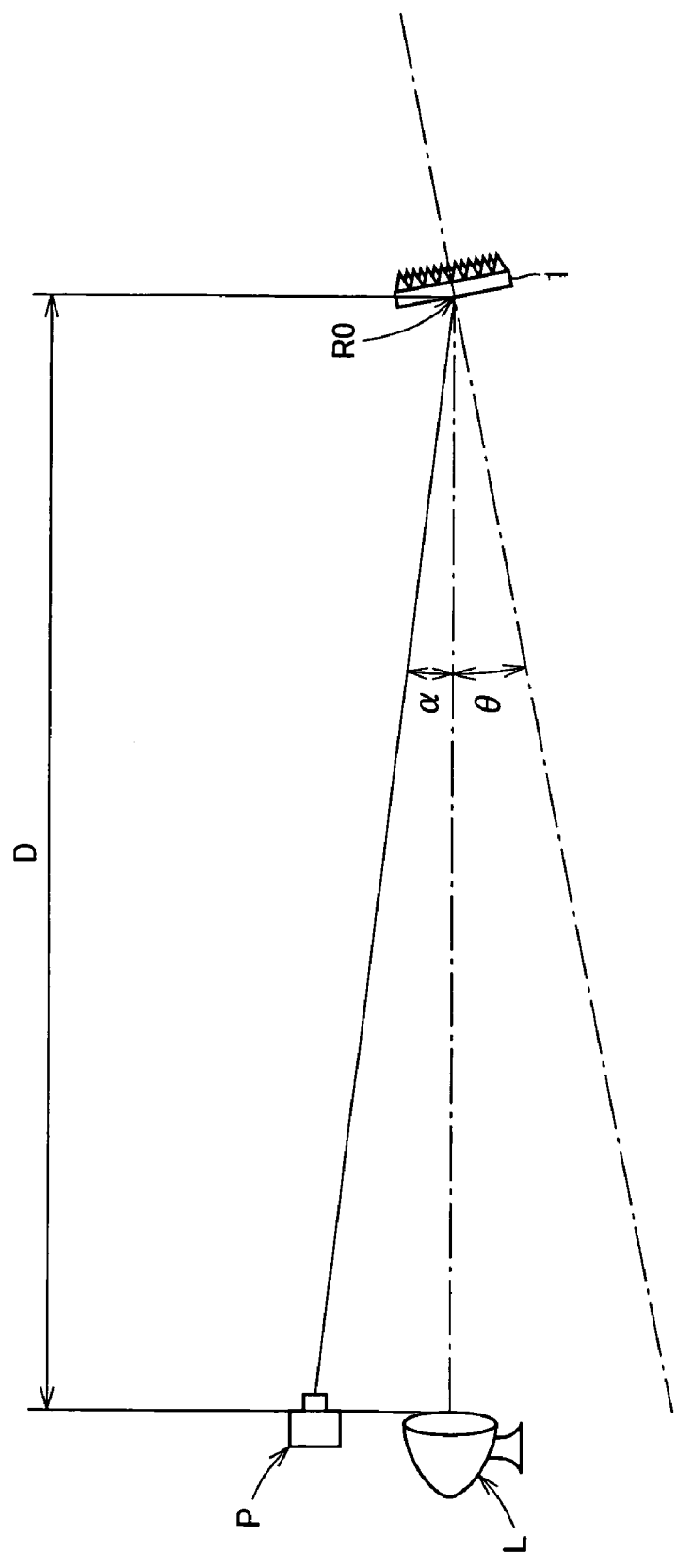
FIG. 25 illustrates the structure of a reflectivity tester for the reflector.

FIG. 25 illustrates the structure of a reflectivity tester for the reflector 1. Referring to FIG. 25, a reflectivity test is made with a projector L (effective diameter: about 50 mm) and a photodetection portion P. The photodetection portion P, having a window of not more than about 25 mm in the horizontal direction and not more than about 13 mm in the vertical direction, is arranged immediately above the projector L. The reflector 1 is separated from the projector L and the photodetection portion P by a distance D (30.5 m in principle). The projector L applies light to the reflector 1, and the photodetection portion P measures the luminous intensity of reflected light. It is assumed that α represents an observation angle formed by a line connecting the center R0 of the reflector 1 and the center of the projector L with each other, and θ represents an incidence angle formed by the optical axis of the reflector 1 and the line connecting the center R0 of the reflector 1 and the center of the projector L with each other. The incidence angle θ is varied in vertical and horizontal planes, for measuring reflection luminous intensity every case.

JIS D 9452-1995 or ISO 6742/2-1985 describes the aforementioned reflectivity test.

Table 1 shows data exhibiting the reflectivity of the reflector 1 obtained by the aforementioned test method.

TABLE 1

| Observation Angel α | Incidence Angle θ | Standard Value (red) | Reflection Luminous intensity (cd/10.76 1×) Attachment Angle | | |
|---|---|---|---|---|---|
| | | | 25° | 30° | 35° |
| 0.2° | 0° | 6.73 | 11.19 | 11.96 | 9.99 |
| | 10° (above) | 4.44 | 7.78 | 9.73 | 11.20 |
| | 10° (below) | 4.44 | 10.03 | 7.90 | 6.04 |
| | 20° (left) | 2.29 | 5.61 | 5.77 | 4.55 |
| | 20° (right) | 2.29 | 4.17 | 4.64 | 4.15 |
| 1.5° | 0° | 0.07 | 0.49 | 0.62 | 0.49 |
| | 10° (above) | 0.05 | 0.25 | 0.35 | 0.51 |
| | 10° (below) | 0.05 | 0.48 | 0.23 | 0.11 |
| | 20° (left) | 0.03 | 0.18 | 0.19 | 0.16 |
| | 20° (right) | 0.03 | 0.11 | 0.11 | 0.11 |

Referring to Table 1, the column of "standard value" shows values (standard type, red) defined in JIS D 9452-1995 or ISO 6742/2-1985. The term "attachment angle" denotes the crossing angle between a line connecting the center of the rear wheel 8 and the center R0 of the reflector 1 with each other and a horizontal plane receiving the bicycle. Further, the terms "(above)", "(below)", "(left)" and "(right)" denote the direction of light illuminated from above, below, left and right of the reflector 1.

Referring to Table 1, light reflected by the reflector 1 satisfies the standard value (reflection luminous intensity at each observation angle α and each incidence angle θ) defined in the aforementioned standard at each of attachment angles 25°, 30° and 35°. Therefore, the attachment position of the reflector 1 according to this embodiment can be varied at least in the range of the "attachment angle" of 25° to 35°.

The mode of attachment of the reflector 1 to the fender 6 is properly changeable. FIGS. 8 to 23 illustrate modifications of the state of the reflector 1 attached to the fender 6.

Figure 11:
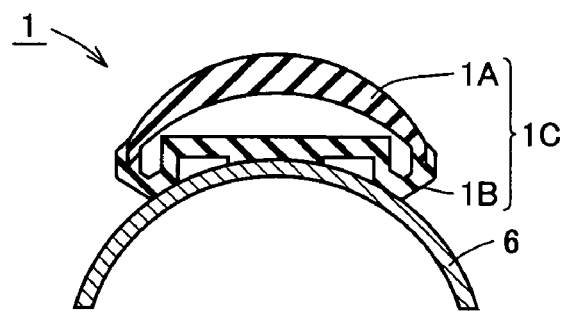
FIG. 11 is a sectional view taken along the line XI-XI in FIG. 8.
Figure 12:
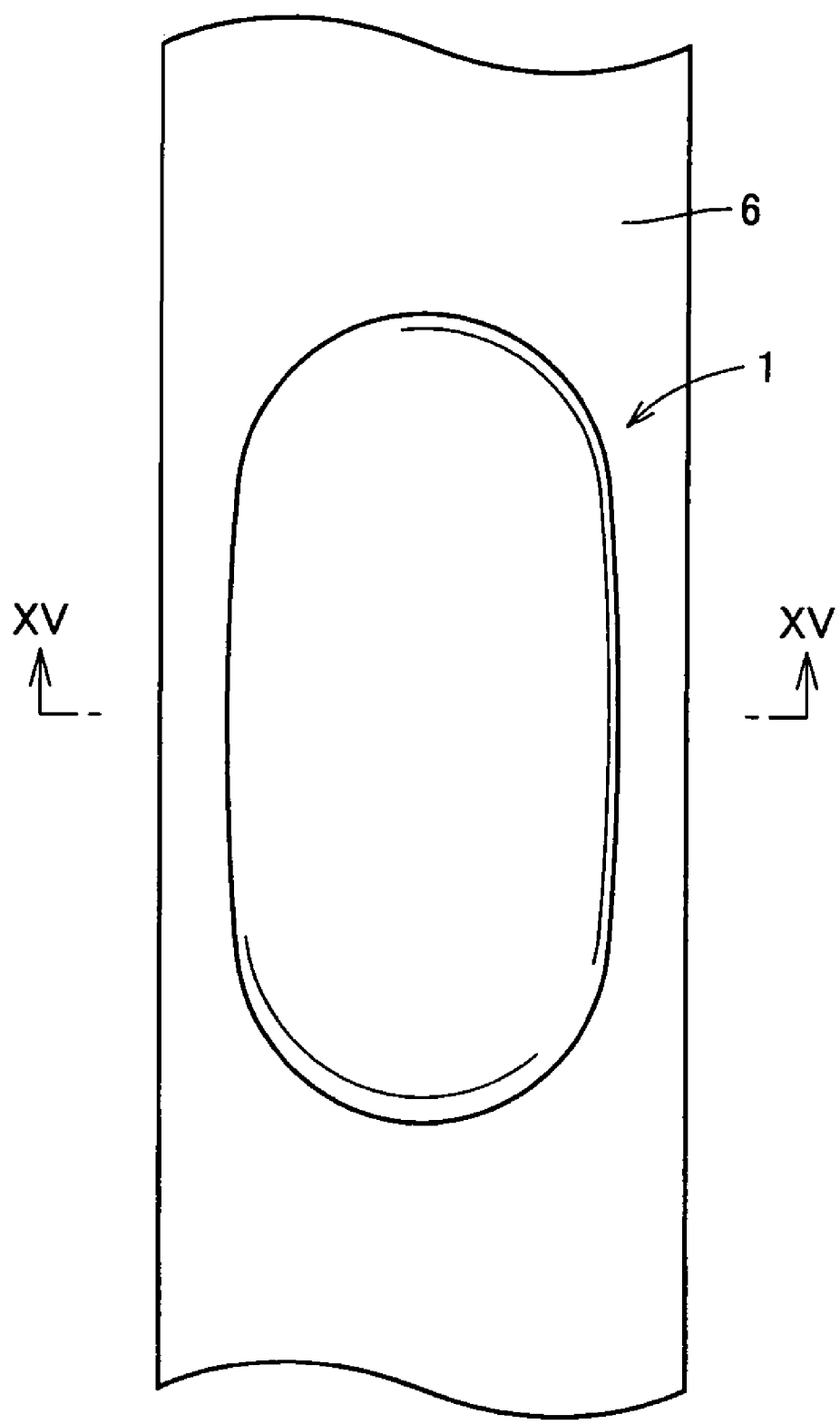
FIG. 12 is a front elevational view showing a second exemplary state of the reflector attached to the fender.
Figure 13:
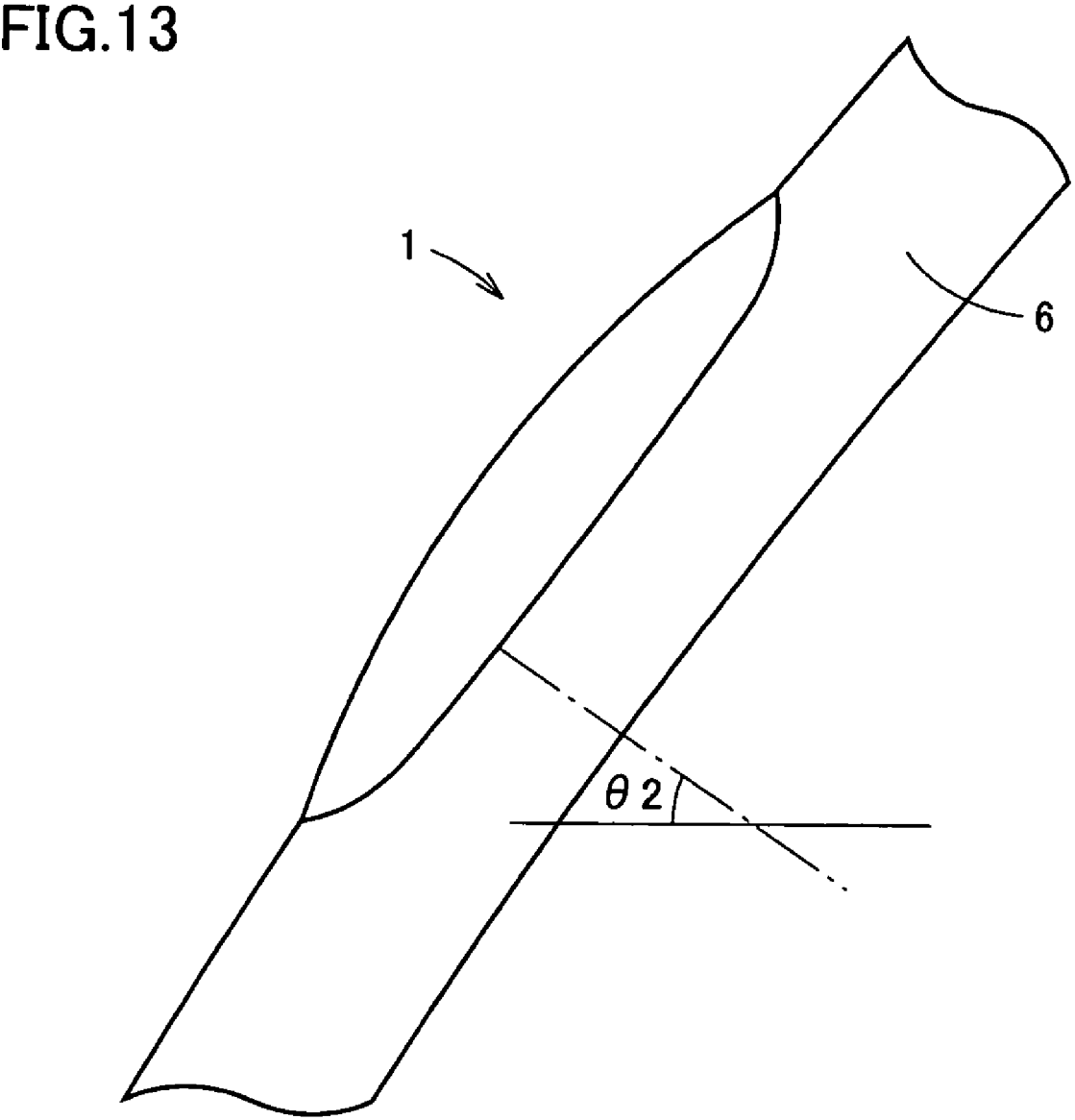
FIG. 13 is a side elevational view showing the second exemplary state of the reflector attached to the fender.
Figure 14:
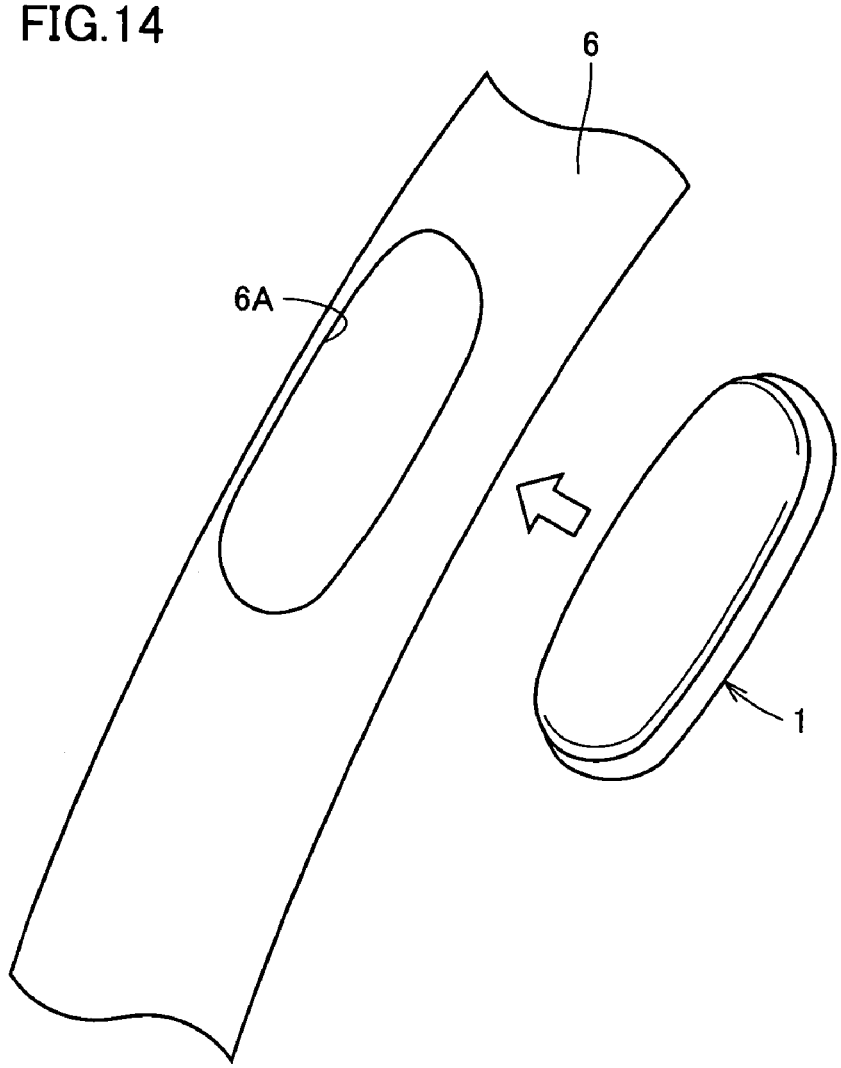
FIG. 14 is a perspective view showing the second exemplary state of the reflector attached to the fender.

FIGS. 8 to 11 illustrate a first modification. FIG. 11 is a sectional view taken along the line XI-XI in FIG. 8. Referring to FIGS. 8 to 11, the reflector 1 may be attached to the fender 6 by bonding the base member 1B to the fender 6.

Figure 15:
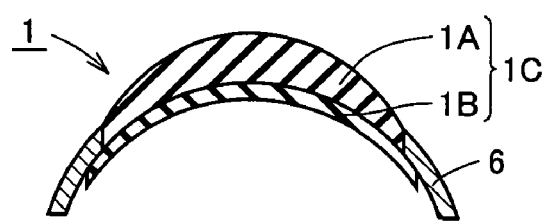
FIG. 15 is a sectional view taken along the line XV-XV in FIG. 12.
Figure 16:
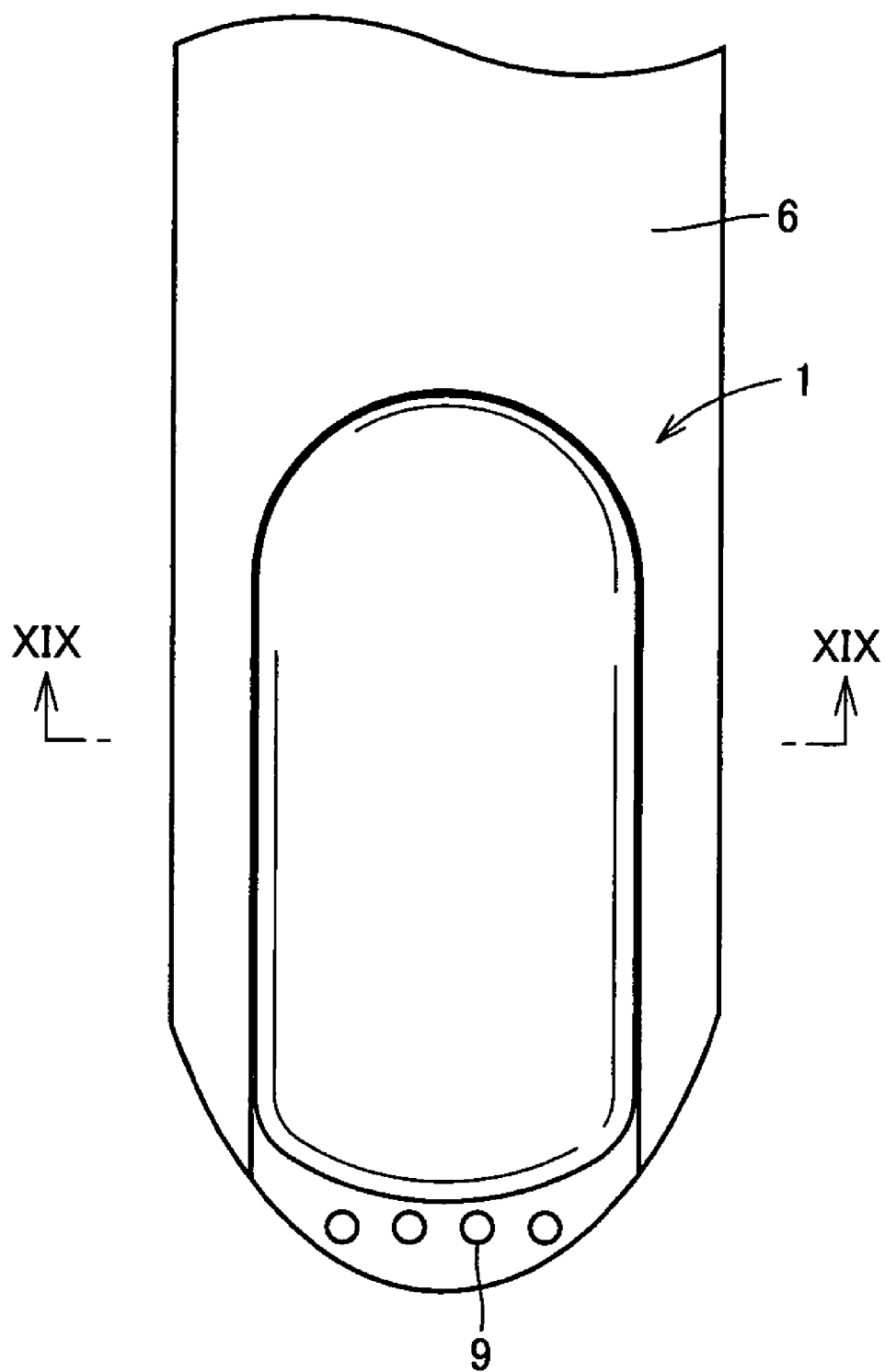
FIG. 16 is a front elevational view showing a third exemplary state of the reflector attached to the fender.
Figure 17:
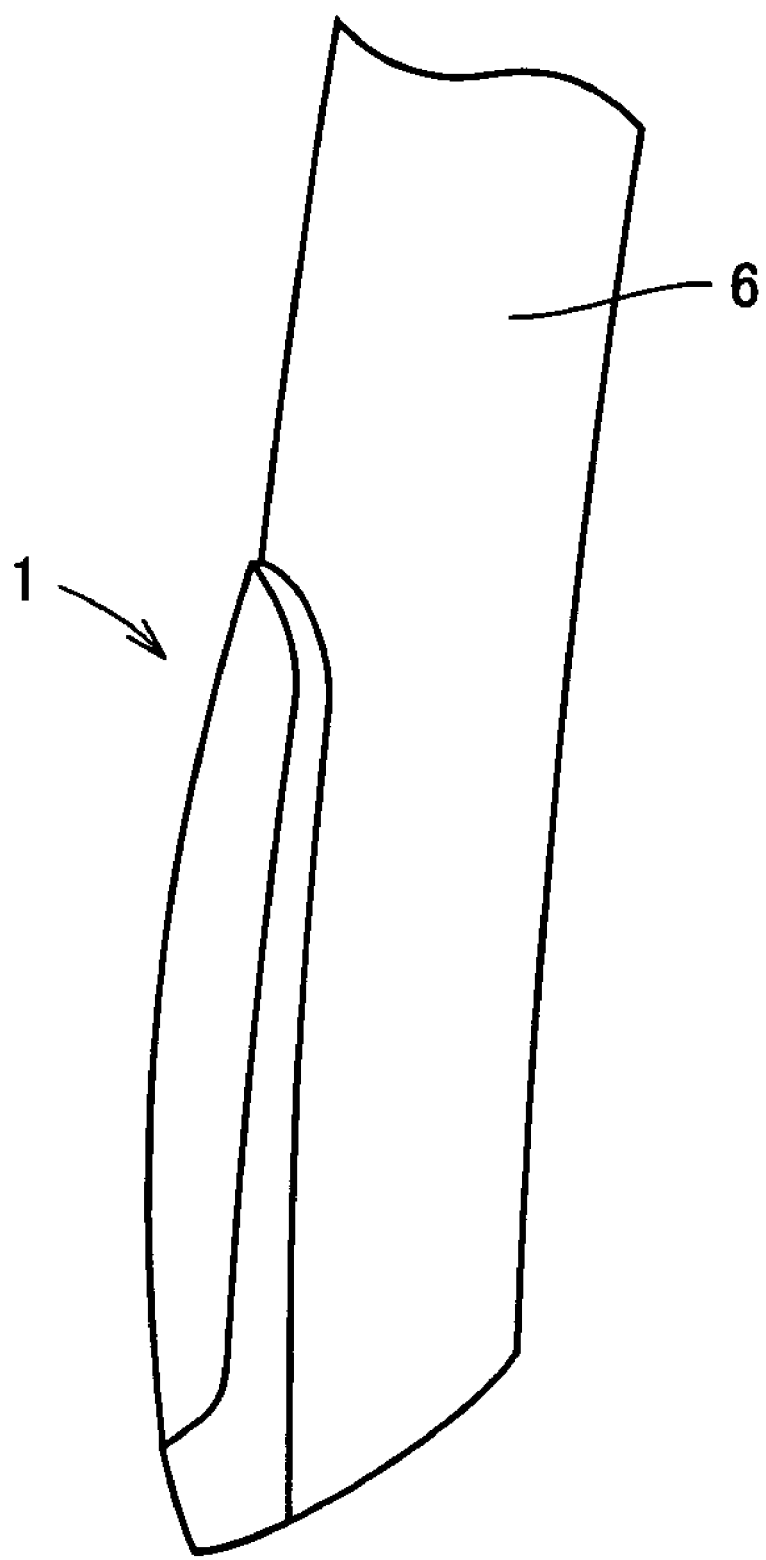
FIG. 17 is a side elevational view showing the third exemplary state of the reflector attached to the fender.
Figure 18:
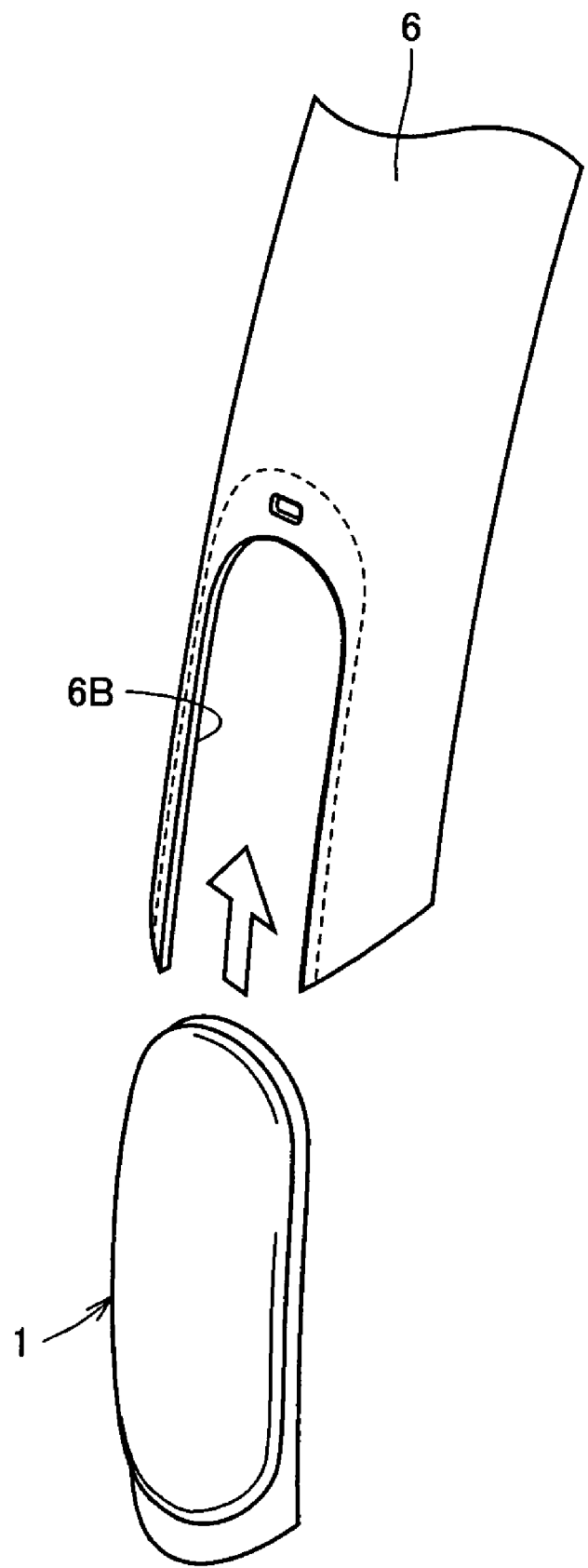
FIG. 18 is a perspective view showing the third exemplary state of the reflector attached to the fender.

FIGS. 12 to 15 illustrate a second modification. FIG. 15 is a sectional view taken along the line XV-XV in FIG. 12. Referring to FIGS. 12 to 15, an opening 6A is provided on the fender 6, so that the reflector 1 is inserted into this opening 6A. In this case, the fender 6 and the reflector 1 are bonded to each other by ultrasonic welding.

Figure 19:
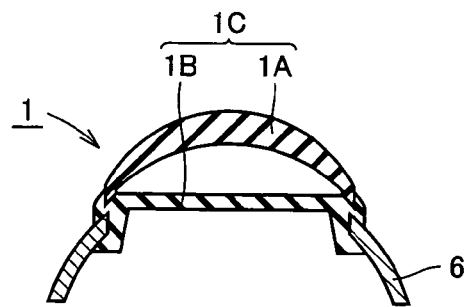
FIG. 19 is a sectional view taken along the line XIX-XIX in FIG. 16.
Figure 20:
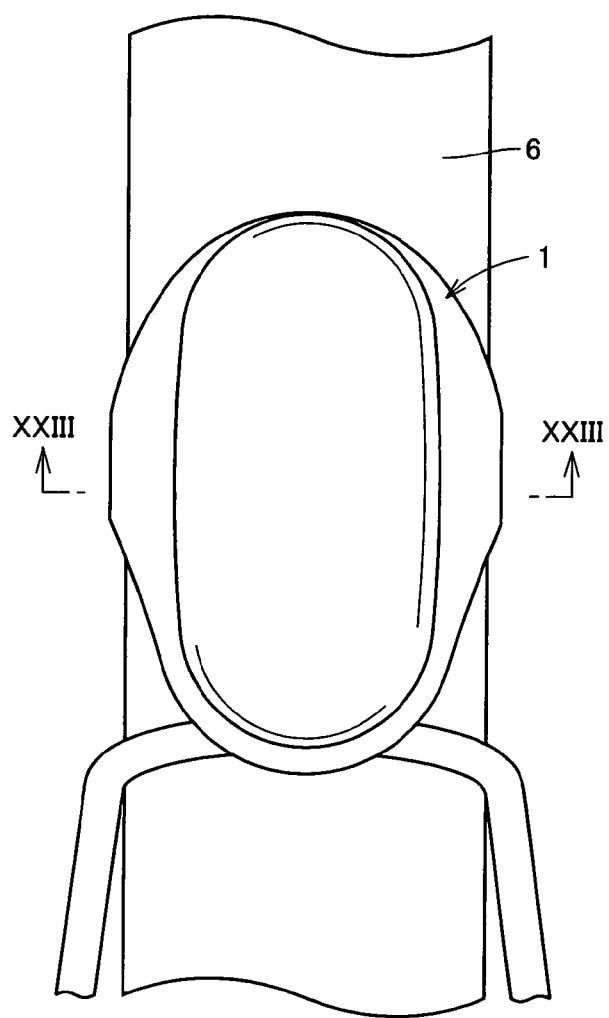
FIG. 20 is a front elevational view showing a fourth exemplary state of the reflector attached to the fender.
Figure 21:
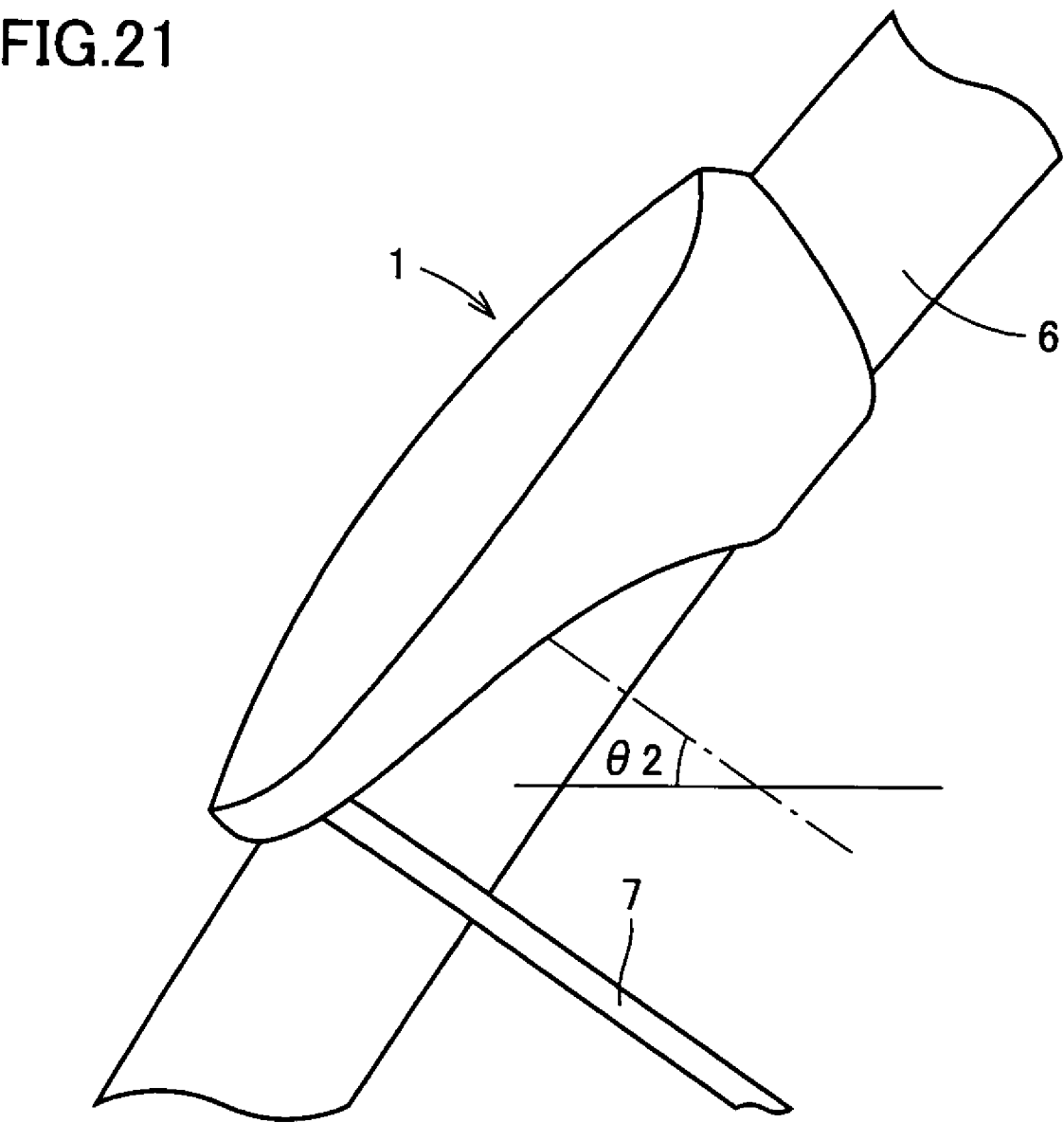
FIG. 21 is a side elevational view showing the fourth exemplary state of the reflector attached to the fender.
Figure 22:
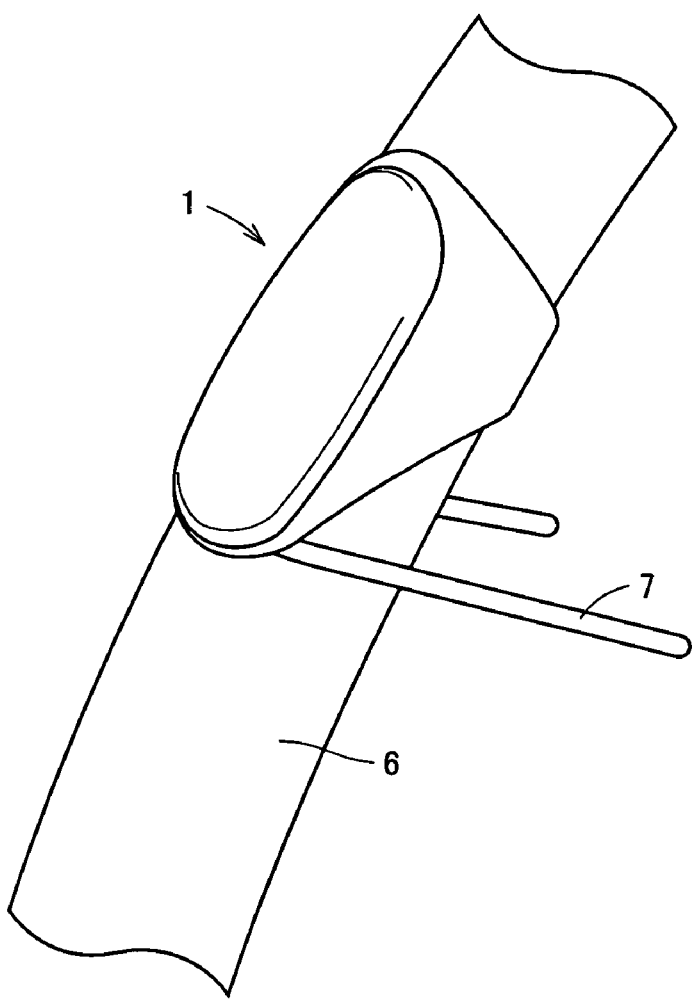
FIG. 22 is a perspective view showing the fourth exemplary state of the reflector attached to the fender.

FIGS. 16 to 19 illustrate a third modification. FIG. 19 is a sectional view taken along the line XIX-XIX in FIG. 16. Referring to FIGS. 16 to 19, a notch 6B is provided on the fender 6, so that the reflector 1 attached to the notch 6B. The notch 6B must be regarded as a mode of an "opening". In this modification, a logo portion 9 is provided on a lower portion of the reflector 1. Thus, the name of the bicycle maker or the like can be displayed without applying a seal or the like to the fender 6.

Figure 23:
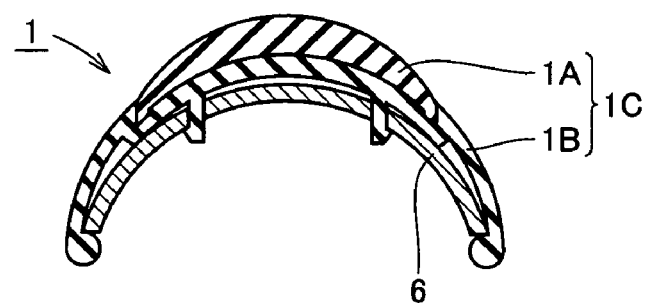
FIG. 23 is a sectional view taken along the line XXIII-XXIII in FIG. 20.

FIGS. 20 to 23 illustrate a fourth modification. FIG. 23 is a sectional view taken along the line XXIII-XXIII in FIG. 20. Referring to FIGS. 20 to 23, the reflector 1 may be assembled into a stay 7 for fixing the fender 6, so that the reflector 1 is fixed to the fender 6 through the stay 7.

In addition to the above, the reflecting member 1A can be directly fixed to the fender 6 by ultrasonic welding or the like while omitting the base member 1B. In this case, the fender 6 functions as a base portion covering the cubic structures 4 so that no water or the like infiltrates into the cubic structures 4. The number of members forming the reflector 1 as well as the cost therefor can be reduced by omitting the base member 1B.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A reflector comprising a body; and
a plurality of reflex reflector structures provided along the front surface of said body, wherein
said front surface has a curved shape arched along a longitudinal section of said body, and each of said plurality of reflex reflector structures having an optical axis, and the optical axes of said plurality of reflex reflector structures are parallel to one another along the longitudinal direction of said body.

2. The reflector according to claim 1, wherein said front surface has an arcuate curved shape.

3. The reflector according to claim 1, wherein said front surface has a central portion extending in a transverse direction perpendicular to the front-back direction and inclined portions obliquely backwardly inclined on both sides of said central portion in a cross section of said body.

4. A bicycle having the reflector according to claim 1 attached to a fender of the rear wheel.

5. The bicycle according to claim 4, having an opening provided on said fender so that said reflector is assembled into said opening.

6. The bicycle according to claim 4, wherein said reflector is assembled into a stay for fixing said fender, to be fixed to said fender through said stay.

7. The bicycle according to claim 4, wherein said reflector is attached to said fender employed as a base portion covering said reflex reflector structures.

* * * * *